United States Patent [19]

Tanner

[11] 3,952,921

[45] Apr. 27, 1976

[54] APPARATUS AND METHOD FOR APPLICATION OF HOT-MELT RESIN ADHESIVE

[75] Inventor: Donald E. Tanner, Owenton, Ky.

[73] Assignee: D & T Manufacturing Co., Cincinnati, Ohio

[22] Filed: Nov. 15, 1973

[21] Appl. No.: 416,100

[52] U.S. Cl. .......... 222/146 HE; 222/399; 219/421; 219/424; 220/67
[51] Int. Cl.² .......................................... B67D 5/62
[58] Field of Search ......... 222/146 HE, 504, 146 R, 222/146 H, 394, 399; 219/421, 422, 424; 220/67, 3, 3.1

[56] References Cited
UNITED STATES PATENTS

| | | | |
|---|---|---|---|
| 1,878,709 | 9/1932 | Kerr | 220/3 |
| 2,564,427 | 8/1951 | Rugeris | 222/146 HE X |
| 2,773,496 | 12/1956 | Czarnecki | 222/146 HE X |
| 2,795,461 | 6/1957 | Durkin | 222/146 HE X |
| 2,839,653 | 6/1958 | Kane | 222/146 HE |
| 3,161,756 | 12/1964 | Haverkamp et al. | 219/422 |
| 3,332,581 | 7/1967 | Estabrooks | 222/504 X |
| 3,708,088 | 1/1973 | Lesher | 222/394 X |
| 3,764,045 | 10/1973 | Ornsteen | 222/146 HE |

Primary Examiner—Stanley H. Tollberg
Assistant Examiner—Joseph J. Rolla
Attorney, Agent, or Firm—Melville, Strasser, Foster & Hoffman

[57] ABSTRACT

Apparatus and method for the application of a hot-melt resin adhesive wherein an enclosed chamber having a restricted discharge orifice is provided with a valve element for opening and closing said orifice; a non-oxidizing gas is introduced into the chamber at super-atmospheric pressure with a charge of resin adhesive, and heat is applied uniformly to the chamber to cause the adhesive to attain a viscous, flowable condition. The gas under super-atmospheric pressure forces a portion of the flowable resin through the orifice when the valve element is in open position.

8 Claims, 5 Drawing Figures

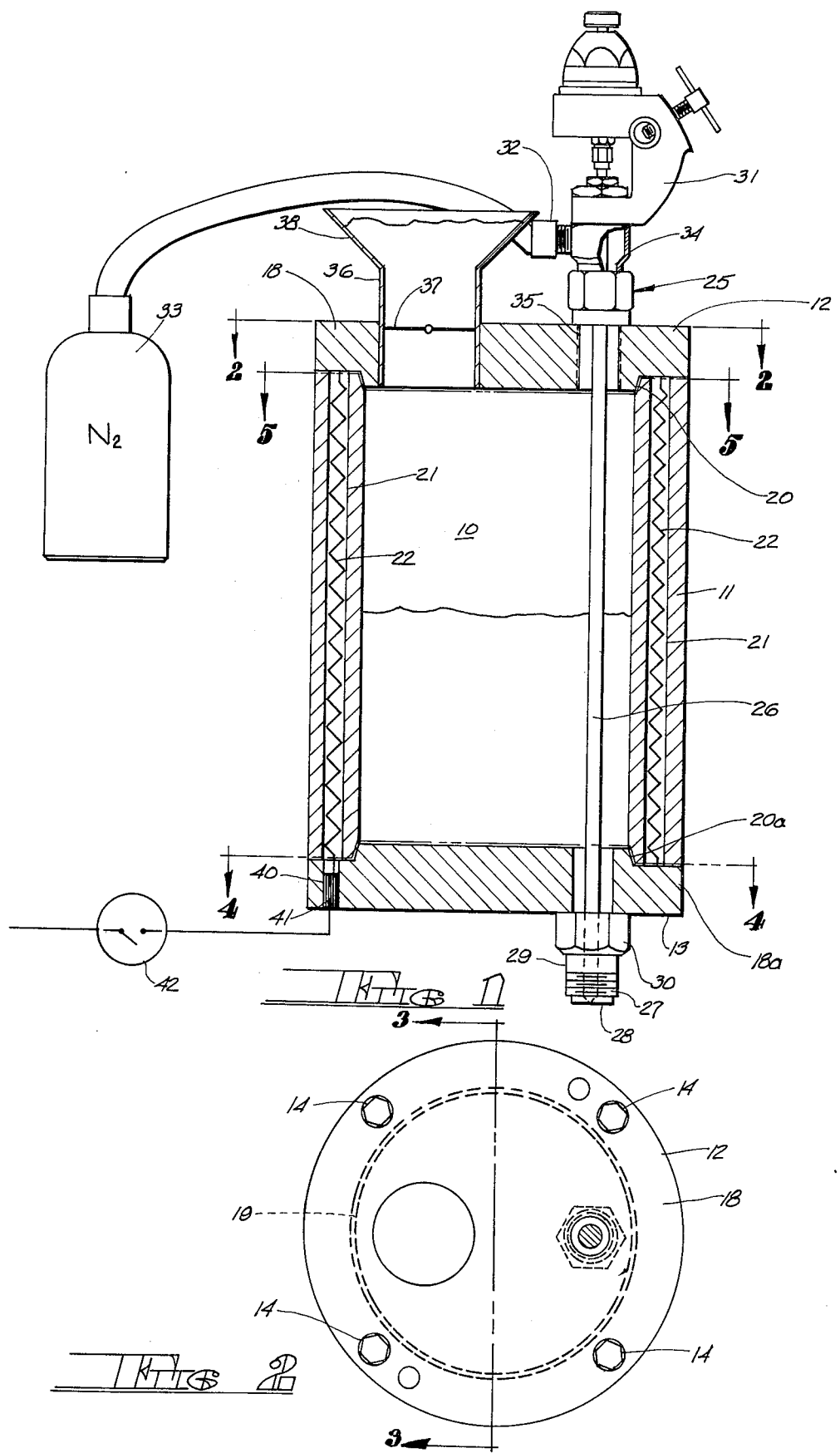

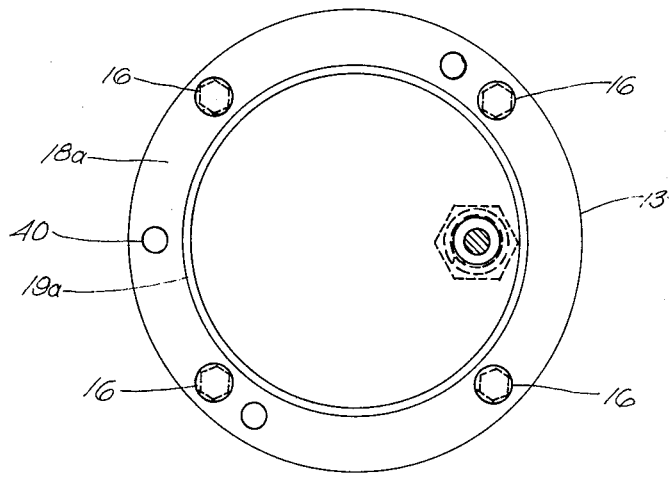
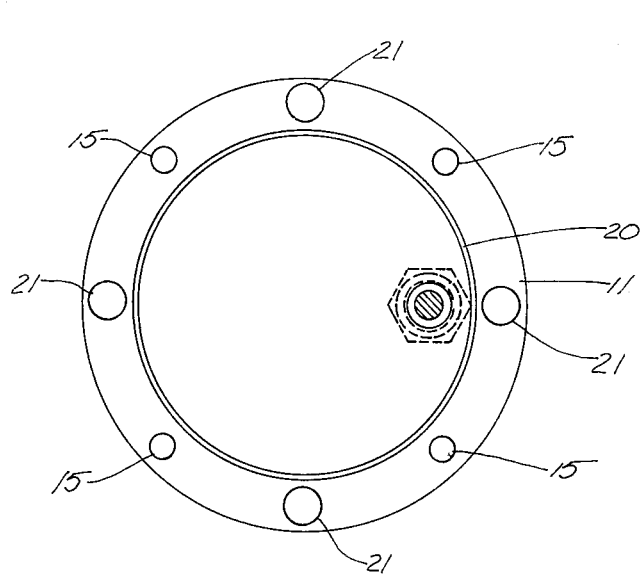

APPARATUS AND METHOD FOR APPLICATION OF HOT-MELT RESIN ADHESIVE

BACKGROUND OF THE INVENTION

1. Field of the Invention

This invention relates to an apparatus and method for continuous application of a hot-melt resin adhesive of the type which becomes flowable at elevated temperatures. The invention has utility generally in the application of hot-melt resin adhesives for metal-to-metal sealing, glass-to-metal sealing, more particularly in the formation of side seams of can bodies and the like as replacement for metallic solders, and in the manufacture of armatures, field windings, and a variety of industrial application involving rapid application of drops of hot-melt resin adhesive to a surface which is to be sealed to another surface.

2. Description of the Prior Art

Apparatus for the application of hot-melt resin adhesives which reach a flowable condition at a temperature of about 250° – 400° F is available and has generally performed satisfactorily. However, such conventional apparatus has proved to be unsatisfactory for use with recently developed hot-melt resin adhesives which require heating to much higher temperatures, e.g. to 600°F or higher, in order to attain a flowable condition suitable for application. It has been found that such resin adhesives undergo oxidation and charring within a relatively short time when used in presently available equipment. Moreover, gaskets, O-rings and similar members of conventional material used in present equipment have shown a tendency to fail under elevated temperature conditions.

Accordingly, it will be evident that there is no presently available apparatus or method for the satisfactory application of hot-melt resin adhesives which become flowable at elevated temperatures, i.e. above about 450°F, without excessive degradation of the resin adhesive.

SUMMARY

It is a principal object of the present invention to provide an apparatus and method for continuous application of a hot-melt resin adhesive over an extended period of time wherein heating of the adhesive to a temperature of about 700°F or higher can be effected without oxidation, charring or degradation of the properties of the adhesive.

It is a further object of the invention to provide a simple and reliable apparatus wherein a gas under super-atmospheric pressure is utilized as the means to discharge the flowable resin adhesive.

The method of applying a hot-melt resin adhesive in accordance with the invention comprises the steps of providing an enclosed chamber having a restricted discharge orifice in the lower portion thereof, a valve element for opening and closing the orifice, means for moving the valve element between open and closed positions, introducing a charge of hot-melt resin adhesive into the chamber, introducing a non-oxidizing gas into the chamber at super-atmospheric pressure, applying uniformly distributed heat to the chamber, controlling the temperature of the chamber at a maximum sufficient to cause the resin adhesive to attain a highly viscous, flowable condition, moving the valve element between open and closed positions, and causing the non-oxidizing gas under super-atmospheric pressure to force a portion of the flowable resin adhesive through the orifice when the valve element is in the open position.

The apparatus of the present invention comprises a chamber having side-walls of a heat-conducting material, a bottom closure member for the chamber provided with a restricted discharge orifice, a valve element for opening and closing the discharge orifice, means for moving the valve element between opened and closed positions, a top closure member for the chamber, means for introducing a resin adhesive into the chamber through the top closure member, means for introducing a gas into the chamber at super-atmospheric pressure through the top closure member, and means for applying heat uniformly to the side-walls of the chamber.

BRIEF DESCRIPTION OF THE DRAWINGS

Reference is made to the accompanying drawings wherein:

FIG. 1 is a diagrammatic sectional view of apparatus embodying the invention;

FIG. 2 is a top plan view of a top closure member;

FIG. 3 is a sectional view taken on the line 3—3 of FIG. 2;

FIG. 4 is a bottom plan view of a bottom closure member; and

FIG. 5 is a sectional view taken on the line 5—5 of FIG. 1.

DESCRIPTION OF THE PREFERRED EMBODIMENTS

Referring to FIG. 1, a chamber adapted to be pressurized internally is indicated generally at 10, composed of side walls 11, preferably in the form of an open-ended cylinder, a top closure plate 12 and a bottom closure plate 13. The top closure plate is secured to cylindrical side walls 11 by means of a plurality of threaded bolts 14 passing through counter-sunk openings in plate 12 and engageable in threaded bores 15 in the upper edge of cylinder 11 (FIG. 5). Similarly, the bottom closure plate 13 is secured by bolts 16 threadably engageable in threaded (not shown) bores in the lower edge of cylinder 11.

Referring to FIGS. 2 and 3, the top closure plate 12 is provided with a peripheral flange 18 overlying the upper edge of cylinder 11, the radially inward extremity of flange 18 terminating in a downwardly and inwardly tapering shoulder 19. The taper of shoulder 19 is preferably on the order of 15° from the vertical. The inner top edge of cylinder 11 is formed with a mating shoulder 20 which engages the shoulder 19 of top closure plate 12 when in assembled condition, and these mating contacting shoulders 19 and 20 provide metal-to-metal sealing surfaces which are gas tight at pressures up to about 250 psig.

Bottom closure plate 13 is similarly provided with a flange 18a and inwardly tapering shoulder 19a which engages a mating shoulder 20a on the lower inner edge of cylinder 11 so as to provide metal-to-metal sealing surfaces in the same manner as described above for top closure plate 12.

Referring to FIG. 5, a plurality of longitudinal bores 21 is provided in the cylindrical side wall 11 extending substantially throughout the length thereof in equally spaced apart relation. Four such bores are shown by way of example, but it will be understood that a greater or smaller number can be provided. Electrical heating elements 22 are provided in each of the bores 21 extending substantially the length thereof, for the purpose of applying heat to the side walls of the chamber. The cylinder 11 is fabricated from a heat conducting material, and hence the heat provided by heating elements 22 is distributed uniformly over the side walls 11 and transferred uniformly into the interior of the chamber 10.

A valve element is shown diagrammatically in FIG. 1 and is indicated generally at 25. This valve element comprises a needle valve 26 extending the length of the chamber, projecting through bottom closure plate 13 and terminating in a tapered tip 27 co-acting with a restricted orifice 28. The orifice 28 is secured in an internally threaded sleeve 29 provided also with external threads for engagement in a threaded opening in the bottom closure plate 13. This assembly is secured to plate 13 by bolt 30.

The upper end of needle valve 26 projects through an opening in top closure plate 12, which is in alignment with orifice 28, and terminates in a housing 31. Within the housing 31 conventionl elements of a spray gun are provided including spring-biased trigger means holding the tip 27 of needle valve 26 in normally closed position against orifice 28, and an inlet for a source of pneumatic pressure fluid. Since these elements and the manner of operation thereof are in every sense conventional these have not been illustrated in the drawings and need not be discussed in detail. As is well-known to a person skilled in the art, a solenoid (not shown) is also provided to operate the trigger mechanism and cause the needle valve 26 to reciprocate vertically between open and closed positions at a predetermined rate.

The housing 31 is further provided with an inlet 32 connected to a source of compressed non-oxidizing gas 33 which is also non-reactive with hot-melt resin adhesives at elevated temperatures. Inlet 32 communicates with a passage 34 in housing 31 and a sleeve 35 threadedly secured in the opening in top closure plate 12 so as to admit the non-oxidizing gas into the interior of chamber 10.

Top closure plate 12 is further provided with a threaded opening through which particulate resin adhesive is fed into the interior of chamber 10. As shown diagrammatically at 36 in FIG. 1, such feed means may comprise a threaded nipple engaged to the opening having a valve 37 to prevent escape of pressurized gas from chamber 10 and a hopper 38 to hold material which will be admitted periodically into chamber 10 after depressurization thereof. Alternatively, means could be provided for continuous or semi-continuous feed of resin material without depressurizing chamber 10, as will be apparent to a person skilled in the art.

In a preferred exemplary embodiment of the apparatus of the invention cylinder 11 is fabricated from a T-6 aluminum alloy with a 7 inch outside diameter, a 5 inch inside diameter and a length of 8 or 12 inches. The top and bottom closure plates 12 and 13 are fabricated from the same alloy and are ⅝ inch in thickness. A thermocouple well 40 is provided in bottom plate 13 for temperature control as hereinafter disclosed.

The valve element is a spray gun sold by Spraying Systems Company, Bellwood, Illinois, as Model No. 24 AUA Autojet. The needle valve and exposed operating parts of this valve element are made of stainless steel.

The heating elements are electrical resistance heating units each having a 700 watt capacity. Four such heating elements are series connected in the above-described exemplary embodiment.

A thermocouple 41 is installed in the thermocouple well 40 and is in a circuit with the four electrical heating elements regulated by a standard control 42, e.g., a furnace control sold under the Trademark "FEN-WAL", for maintaining a predetermined temperature as measured at the thermocouple well 40.

A source of compressed non-oxidizing gas indicated diagrammatically at 33, is provided for introduction of gas into the interior of chamber 10 at a pressure ranging between about 30 and 250 psig. Nitrogen is a preferred gas for this purpose, although other non-oxidizing, non-reactive gases such as argon could be used.

A preferred hot-melt resin adhesive for use in the apparatus of the present invention is that sold under the Registered Trademark "MONTAC" by Monsanto Company. This is a polyester-polyamide copolymer which softens at about 480°F but is preferably heated to about 600° F in practicing the process of the present invention. At 600°F the material has a viscosity of 5000 centipoises, so that it is flowable but highly viscous, and hence a droplet or "dot" is discharged from the orifice 28 when the needle valve 26 is in the open position for a fraction of a second. It will be understood that in industrial operations such as the forming of can body side walls a solenoid will be set in such manner as to cause the needle valve to open and close rapidly, e.g. 100–200 times per minute, so as to deposit dots of resin adhesive at closely spaced intervals along a moving metal strip.

A significant aspect of the method of the invention is the use of a non-oxidizing gas under pressure both to blanket the heated resin adhesive, thereby preventing oxidation or other degradation thereof, and at the same time provide the driving force for discharging the viscous resin adhesive through the outlet orifice. In prior art apparatus of this type, a pump has generally been utilized as the driving force. It is evident that elimination of a pump and its associated electrical circuit constitutes not only a saving in construction cost, but also constitutes a simplification of the apparatus and a reduction in maintenance and cleaning problems.

The use of a heat conductive alloy for the cylindrical side walls 11 and the 1 inch thickness of such side walls insures uniform heat distribution so that charring of the resin is avoided over extended periods of operation. It will be noted that the feed inlet for the resin is disposed adjacent one of the electrical heating elements, so that a fresh charge of resin is subjected to heat immediately upon introduction into the chamber 10.

The metal-to-metal sealing surfaces between the cylinder 11 and the top and bottom closure plates 12 and 13 eliminate the need for gaskets, O-rings, or other conventional sealing members, and hence the elevated temperature conditions under which the apparatus is operated cause no problems with respect to failure or replacement of such conventional sealing members. Moreover, use of the same alloy for the cylindrical side walls 11 and the top and bottom closure plates 12 and 13 minimizes differential thermal expansion. The tapering configuration of the mating shoulders 19, 20 and 19a, 20a ensures effective metal-to-metal sealing surfaces (not merely line contact) despite any temperature differential between the side walls and top and bottom closure plates which might occur, e.g. on start-up.

Although a preferred valve element has been described, it will be understood that other commercially available valve elements operating in an equivalent manner may be substituted.

Modifications may be made without departing from the spirit and scope of the invention, and no limitations are to be inferred or implied except as specifically set forth in the appended claims.

The embodiments of the invention in which an exclusive property or privilege is claimed are defined as follows:

1. A method of applying a hot-melt resin adhesive of the type which becomes flowable at temperatures of about 600°F or higher, comprising the steps of:
providing an enclosed chamber having a restricted discharge orifice in the lower portion thereof, a valve element for opening and closing said orifice, and means for moving said valve element between open and closed positions;
introducing a particulate charge of said hot-melt resin adhesive into said chamber;
introducing a non-oxidizing gas into the upper portion of said chamber at super-atmospheric pressure;
applying uniformly distributed heat to said charge of resin;
controlling the temperature of said chamber to a predetermined maximum of 600° to 700° F sufficient to cause said resin adhesive to attain a highly viscous, flowable condition; and
causing said means for moving said valve element to reciprocate said valve element rapidly between open and closed positions up to 200 times per minute, whereby said non-oxidizing gas under super-atmospheric pressure forces a drop of said flowable resin adhesive through said orifice each time said valve element is in the open position.

2. The method claimed in claim 1, wherein said non-oxidizing gas is nitrogen and is introduced into said chamber at a pressure of about 30 to about 200 psig.

3. The method claimed in claim 1, wherein said resin adhesive is a polyamide-polyester copolymer having a viscosity of 5000 centipoises at 600°F.

4. Apparatus for applying a hot-melt resin adhesive of the type which becomes flowable at temperatures of about 600°F or higher, said apparatus comprising:
a chamber having cylindrical side walls formed from a T-6 aluminum alloy;
a removable bottom closure member for said chamber formed from said aluminum alloy comprising an annular plate having inwardly tapering edges adapted to mate with inwardly tapering surfaces of said side walls whereby to provide metal-to-metal sealing surfaces therebetween which are gas tight at pressures up to 250 psig, said bottom closure member having a restricted discharge orifice therein;
a valve element for opening and closing said discharge orifice extending through said chamber and into said orifice;
means for moving said valve element between open and closed positions up to 200 times per minute;
a removable top closure member for said chamber formed from said aluminum alloy comprising an annular plate having inwardly tapering edges adapted to mate with inwardly tapering surfaces of said side walls whereby to provide metal-to-metal sealing surfaces therebetween which are gas tight at pressures up to 250 psig;
means for introducing particulate resin adhesive into said chamber through said top closure member;
means for introducing a non-oxidizing gas into said chamber at super-atmospheric pressure through said top closure member; and
means for applying heat uniformly to said side walls comprising a plurality of electrical heating elements positioned in equally spaced-apart longitudinal bores in said side walls, said heating elements and said bores extending substantially the length of said side walls.

5. The apparatus claimed in claim 4, including means for controlling said heat applying means whereby to maintain said side walls at a predetermined maximum temperature.

6. The apparatus claimed in claim 4, wherein said valve element comprises an elongated needle valve vertically reciprocable between open and closed positions, and a housing in which the upper end of said needle valve is engaged, said housing being secured to said upper closure member.

7. The apparatus claimed in claim 6, wherein said means for moving said valve element include a pneumatic pressure source, spring-biased trigger means in said housing holding said needle valve in normally closed position, and solenoid means for actuating said trigger means to open said needle valve by pneumatic pressure.

8. The apparatus claimed in claim 6, wherein said means for introducing a gas into said chamber under super-atmospheric pressure is connected to said housing, and including passages within said housing and through said top closure member communicating with the interior of said chamber.

* * * * *